United States Patent
Brunner et al.

(10) Patent No.: US 9,973,127 B2
(45) Date of Patent: May 15, 2018

(54) CONTROL SYSTEM FOR CONTROLLING THE ROTATIONAL SPEED OF A DRIVE MOTOR

(75) Inventors: Harald Brunner, Ingolstadt (DE); Andreas Göbel, Burgheim (DE); Jens Kielstein, Grossmehring (DE)

(73) Assignee: AUDI AG, Ingolstadt (DE)

( * ) Notice: Subject to any disclaimer, the term of this patent is extended or adjusted under 35 U.S.C. 154(b) by 493 days.

(21) Appl. No.: 14/378,229

(22) PCT Filed: Aug. 1, 2012

(86) PCT No.: PCT/EP2012/003269
§ 371 (c)(1),
(2), (4) Date: Feb. 13, 2015

(87) PCT Pub. No.: WO2013/120503
PCT Pub. Date: Aug. 22, 2013

(65) Prior Publication Data
US 2015/0162862 A1 Jun. 11, 2015

(30) Foreign Application Priority Data
Feb. 15, 2012 (DE) .......................... 10 2012 003 020

(51) Int. Cl.
*H02P 7/28* (2016.01)
*H02P 23/00* (2016.01)
(Continued)

(52) U.S. Cl.
CPC .......... *H02P 23/0027* (2013.01); *B60L 15/20* (2013.01); *B60W 20/00* (2013.01);
(Continued)

(58) Field of Classification Search
CPC ............................... H02P 7/2805; B60T 8/885
(Continued)

(56) References Cited

U.S. PATENT DOCUMENTS

| 7,762,922 B2 | 7/2010 | Dreibholz et al. |
| 8,207,696 B1 * | 6/2012 | Ito .......................... H02P 7/2805 318/268 |

(Continued)

FOREIGN PATENT DOCUMENTS

| CN | 1428256 A | 7/2003 |
| CN | 101688485 A | 3/2010 |

(Continued)

OTHER PUBLICATIONS

International Search Report issued by the European Patent Office in International Application PCT/EP2012/003269 dated Oct. 18, 2012.
(Continued)

*Primary Examiner* — Eduardo Colon Santana
*Assistant Examiner* — Cortez Cook
(74) *Attorney, Agent, or Firm* — Henry M. Feiereisen LLC

(57) ABSTRACT

The rotational speed of at least one drive motor of a motor vehicle is controlled by an electronic control system, wherein the differential rotational speed between a specified target rotational speed and an actual rotational speed of the drive motor is considered as a system value for determining the control parameters that influence the rotational speed control process. As an additional system value, the magnitude and direction of the differential rotational speed gradient are considered when determining the control parameters.

8 Claims, 1 Drawing Sheet

(51) Int. Cl.
*B60L 15/20* (2006.01)
*B60W 20/00* (2016.01)
*F02D 31/00* (2006.01)
*B60W 10/06* (2006.01)
*B60W 10/08* (2006.01)
*B60W 50/00* (2006.01)
*B60W 20/40* (2016.01)

(52) U.S. Cl.
CPC ...... *F02D 31/001* (2013.01); *B60L 2240/421* (2013.01); *B60L 2260/26* (2013.01); *B60L 2260/42* (2013.01); *B60L 2260/44* (2013.01); *B60W 10/06* (2013.01); *B60W 10/08* (2013.01); *B60W 20/40* (2013.01); *B60W 2050/0009* (2013.01); *B60W 2050/0026* (2013.01); *B60W 2510/0638* (2013.01); *B60W 2510/0652* (2013.01); *B60W 2510/081* (2013.01); *B60W 2510/082* (2013.01); *B60W 2710/0644* (2013.01); *B60W 2710/081* (2013.01); *F02D 2200/101* (2013.01); *F02D 2200/1012* (2013.01); *Y02T 10/6286* (2013.01); *Y02T 10/645* (2013.01); *Y02T 10/72* (2013.01); *Y02T 10/7275* (2013.01)

(58) Field of Classification Search
USPC .................................. 180/65.27; 701/13, 22
See application file for complete search history.

(56) References Cited

U.S. PATENT DOCUMENTS

2001/0020789 A1* 9/2001 Nakashima ............ B60K 6/365 290/40 C
2003/0144773 A1* 7/2003 Sumitomo ............. B60K 6/442 701/22
2007/0233332 A1* 10/2007 Kawada ................. B60K 6/365 701/13
2008/0246335 A1* 10/2008 Spieker ................... B60T 8/885 303/122.08
2011/0093146 A1* 4/2011 Falkenstein ........... B60W 10/02 701/22

FOREIGN PATENT DOCUMENTS

| | | | |
|---|---|---|---|
| CN | 102275585 A | 12/2011 | |
| DE | 102005042650 | 3/2007 | |
| DE | 102006005468 | 8/2007 | |
| DE | 102007016514 | 10/2008 | |
| DE | 102007025253 | 12/2008 | |
| DE | 102009055246 | 6/2011 | |
| DE | 102009055922 | 6/2011 | |
| DE | 102010030382 | * 12/2011 | ............ B60W 10/06 |

OTHER PUBLICATIONS

Chinese Search Report issued by the Chinese Patent Office dated Jan. 23, 2017 in counterpart Chinese Patent Application No. 2012800698614.

English translation of Chinese Search Report issued by the Chinese Patent Office dated Jan. 23, 2017 in counterpart Chinese Patent Application No. 2012800698614.

* cited by examiner

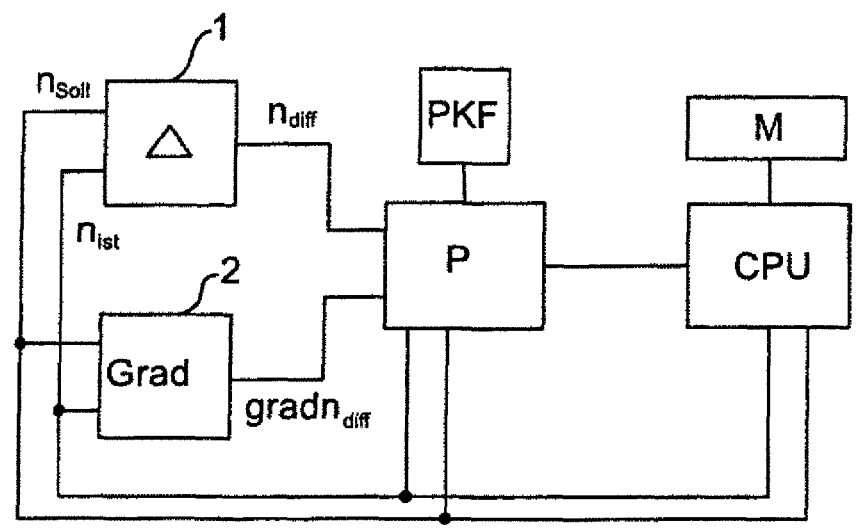

CONTROL SYSTEM FOR CONTROLLING THE ROTATIONAL SPEED OF A DRIVE MOTOR

CROSS-REFERENCES TO RELATED APPLICATIONS

This application is the U.S. National Stage of International Application No. PCT/EP2012/003269, filed Aug. 1, 2012, which designated the United States and has been published as International Publication No. WO 2013/120503 and which claims the priority of German Patent Application, Serial No. 10 2012 003 020.7, filed Feb. 15, 2012, pursuant to 35 U.S.C. 119(a)-(d).

BACKGROUND OF THE INVENTION

The invention relates to an electronic control system for controlling the rotational speed of at least one drive motor of a motor vehicle.

The engine speed in motor vehicles is controlled according to the prior art by taking into account the rotational speed difference between a target rotational speed and a measured actual rotational speed. The rotational speed control function is usually integrated in the engine controller, wherein both the rotational speed difference and the gradient of the actual rotational speed are evaluated for determining the control parameters. A gradient evaluation can provide a faster response to a drifting actual speed than in a exclusive differential speed evaluation, since the controller can take into account the rate of change of the actual speed value. However, such a control system presupposes that the target speed remains at least virtually constant and at least does not exhibit rotational speed jumps.

For electric vehicles and hybrid vehicles with an internal combustion engine and an electric motor as drive motors, the target rotational speed is in many cases no longer approximately constant, but can exhibit significant rotational speed jumps depending on the operating mode of the motor vehicle. For different operating conditions, such hybrid driving, hybrid stopped, electrically driving, electrically stopped, additional starting of a second drive motor, mutually different as well as dynamic target rotational speeds arise, wherein switching between them is possible within a short time. A target rotational speed may also move away from a constant actual speed, which when only considering the rotational speed gradient of the actual rotational speed, does not provide a faster reaction time compared to an evaluation of exclusively the difference in the rotational speed. In these conventional control systems, the gradient evaluation can in special cases even cause an erroneous influence on the rotational speed control.

DE 10 2006 005 468 A1 discloses a method for operating a parallel hybrid drive train of a motor vehicle, wherein the rotational speed of a combustion engine and of an electric motor is controlled for controlling the transmission. This known method, however, does not relate to the rotational speed control of a drive motor of a motor vehicle while taking into account highly variable or abruptly changing target rotational speeds.

SUMMARY OF THE INVENTION

It is an object of the invention to provide an electronic control system for controlling the rotational speed of at least one drive motor of a motor vehicle, which allows a fast and safe rotational speed control even in the event of a changing target rotational speed.

According to one aspect of the invention, an electronic control system is provided wherein the rotational speed difference between a predetermined target rotational speed and an actual rotational speed and in addition, the magnitude and direction of the rotational speed difference gradient are taken into account for determining the control parameters. The rotational speed difference and the rotational speed difference gradient can be described as system values, which the electronic control system continuously monitors to control the rotational speed. By taking into account the rotational speed difference gradient, the rate of change of the rotational speed difference can be detected, for example, by a processor, which in conjunction with the associated rotational speed difference is then able to quickly and accurately adjust the control torque acting on the rotational speed control.

The control system may also take into account as additional system values for determining control parameters the rate of change of the target rotational speed and/or of the actual speed, whereby the relative rate of change of these two system values can be deduced by additionally taking into account the target rotational speed and/or the actual rotational speed. The control performance can be further refined by taking into account these additional system values.

According to a particularly advantageous embodiment, control parameters for the control system associated with the possible system values may be stored in a memory, thereby allowing the control system to access these values directly. Although control parameters can in principle be determined by suitable mathematical methods, a high control speed and easy adaptation to different drive systems can be realized with the parameters stored in a parameter memory map.

The parameters data stored in the parameter memory map may be stored in corresponding maps in association with system values and system value pairs or links of several system values. The memory maps may be multi-dimensional, so that parameter associated with a plurality of system value links may be stored.

The control system according to the invention can also be used to control the rotational speeds of, for example, two drive motors, as provided in a hybrid vehicle. The required control torque can thus be influenced quickly and correctly for each of the drive motors that operate individually or jointly, depending on the differential rotational speed and the rotational speed difference gradient and possibly other system values. It can be immediately determined by considering the rotational speed difference gradient whether the monitored rotational speeds converge or diverge.

The control system provides a simple application of the control parameters also for non-electrified drive systems, because these control parameters can be stored in a corresponding map as motor-specific control parameters.

BRIEF DESCRIPTION OF THE DRAWING

The invention will now be described in more detail with reference to an exemplary embodiment illustrated in the drawing which shows in:

FIG. 1 a block diagram of an electronic control system according to the invention.

DETAILED DESCRIPTION OF PREFERRED EMBODIMENTS

FIG. 1 shows a block diagram of an electronic control system according to the invention, which includes an engine controller CPU controlling a drive motor M. The engine controller CPU supplies the actual rotational speed $n_{ist}$ and the target rotational speed $n_{soll}$ of the drive motor M to a subtracter 1 and to a device 2, which forms a rotational speed difference gradient $\text{Gradn}_{diff}$ from the difference between $n_{soll}$ and $n_{ist}$ and transmits this rotational speed difference gradient $\text{Gradn}_{diff}$ to a processor P. The subtracter 1 transmits to the processor P the rotational speed difference $n_{diff}$.

The rotational speed difference $n_{diff}$ and the rotational speed difference gradient $\text{Gradn}_{diff}$ supplied to the processor P can generally be referred to as system values, which the processor P uses to determine control parameters. In the illustrated exemplary embodiment, the processor P is connected to a parameter map memory PKF in which control parameters associated with all possible combinations of system values are stored in the form of one or more characteristic curve fields.

In the illustrated exemplary embodiment, the target rotational speed $n_{soll}$ and the actual rotational speed $n_{ist}$ are transmitted to the processor P as additional system values, so that a parameter mapping can be performed even by taking into account these additional system values. In principle, other system values may also be taken into account to determine the control parameters.

The control parameters determined by the processor P are transmitted to the engine controller CPU so as to enable the engine controller CPU to control the rotational speed of the motor M by using a control program and taking into account these parameters.

The embodiment illustrated in FIG. 1 represents only one possible exemplary embodiment. The control parameters used to control the rotational speed may also be determined in part or completely by a mathematical calculation method which, however, would require a high computing power. Furthermore, the mathematical method would need to be adapted for each engine types, which would be relatively complex. In order to make adjustments to different engine types and different application areas as easily as possible, system-specific control parameters are preferably stored in the parameter map memory PKF. An adaptation to different engine types or application areas is possible by simply exchanging the control parameters in the parameter-map memory.

What is claimed:

1. An electronic control system for controlling a rotational speed of at least one drive motor of a motor vehicle, comprising:
   a vehicle-mounted engine controller supplying a predefined target rotational speed and a measured actual rotational speed to a subtractor which forms therefrom a rotational speed difference;
   a gradient forming device determining a rotational speed difference gradient from the predefined target rotational speed and the measured actual rotational speed, the gradient having a magnitude and a direction of the rotational speed difference; and
   a processor receiving from the subtractor the rotational speed difference and from the gradient forming device the rotational speed difference gradient as system values and determining therefrom control parameters influencing control of the rotational speed,
   wherein the engine controller controls the rotational speed of the at least one drive motor based on the control parameters.

2. The control system of claim 1, further comprising a memory storing the control parameters associated with system values or with combinations of the system values.

3. The control system of claim 2, wherein the processor reads out from a parameter map stored in the memory control parameters associated with the system values or the combinations of system values and transmits the control parameters to the engine controller.

4. The control system of claim 1, wherein the motor vehicle is a hybrid vehicle and comprises an internal combustion engine and of an electric motor as drive motors, and wherein engine-specific control parameters associated with each drive motor are used for controlling the rotational speed of the internal combustion engine and of the electric motor.

5. A method for controlling the rotational speed of at least one drive motor of a motor vehicle, comprising:
   computing with a vehicle-mounted controller a rotational speed difference between a predefined target rotational speed and a measured actual rotational speed of the at least one drive motor as system values;
   computing with the controller a rotational speed difference gradient from the predefined target rotational speed and the measured actual rotational speed, the gradient having a magnitude and a direction of the rotational speed difference, the gradient being an additional system value;
   providing the rotational speed difference and the gradient to a processor which determines therefrom control parameters that influence control of the rotational speed; and controlling the rotational speed based on the control parameters.

6. The method of claim 5, further comprising storing in a memory at least one of the system values, the additional system value, the control parameters associated with the system values, or any combination thereof.

7. The method of claim 5, further comprising
   transmitting the system values and the additional system value to a processor which reads, from a parameter map stored in the memory, control parameters associated with the system values and the additional system values or with combinations of the system values and the additional system values, and
   transmitting the control parameters to an engine controller of the at least one drive motor.

8. The method of claim 5, and further comprising, using engine-specific control parameters for controlling the rotational speed of each of an internal combustion engine and of an electric motor arranged in a hybrid vehicle as drive motors.

* * * * *